United States Patent
Batchelor et al.

(10) Patent No.: US 6,189,117 B1
(45) Date of Patent: Feb. 13, 2001

(54) ERROR HANDLING BETWEEN A PROCESSOR AND A SYSTEM MANAGED BY THE PROCESSOR

(75) Inventors: Gary William Batchelor; Brent Cameron Beardsley; Michael Thomas Benhase; Jack Harvey Derenburger; Carl Evan Jones; Robert Earl Medlin; Belayneh Tafesse; Juan Antonio Yanes, all of Tucson, AZ (US)

(73) Assignee: International Business Machines Corporation, Armonk, NY (US)

( * ) Notice: Under 35 U.S.C. 154(b), the term of this patent shall be extended for 0 days.

(21) Appl. No.: 09/135,835

(22) Filed: Aug. 18, 1998

(51) Int. Cl.$^7$ ...................................................... G06F 11/00
(52) U.S. Cl. .................................................. 714/48; 714/9
(58) Field of Search ................................... 710/112, 262; 711/227, 244; 714/9, 27, 34, 35, 48, 56

(56) References Cited

U.S. PATENT DOCUMENTS

| 5,297,263 | * | 3/1994 | Ohtosuka | 712/244 |
| 5,488,688 | * | 1/1996 | Gonzales | 714/34 |
| 5,499,346 | | 3/1996 | Amini et al. | |
| 5,555,250 | | 9/1996 | Walker et al. | |
| 5,666,559 | | 9/1997 | Wisor et al. | |
| 5,758,065 | * | 5/1998 | Reams | 714/48 |
| 5,809,260 | | 9/1998 | Bredin | |
| 5,815,647 | | 9/1998 | Buckland et al. | |
| 6,016,559 | * | 1/2000 | Kim | 714/48 |
| 6,078,977 | * | 6/2000 | Klein | 710/129 |

FOREIGN PATENT DOCUMENTS

| 53-124143 | 10/1978 | (JP) . |
| 56-103539 | 7/1981 | (JP) . |
| 63-166532 | 7/1988 | (JP) . |
| 1-075914 | 3/1989 | (JP) . |
| 7030650 | 1/1995 | (JP) . |

OTHER PUBLICATIONS

Hardware Feature Detection and Configuration with Failsafe Checkpointing; IBM Technical Disclosure Bulletin, vol. 38, No. 12, Dec. 1995.

Recovery Procedure for Data Channel, IBM Technical Disclosure Bulletin, vol. 36, No. 06A Jun. 1993.

Enterprise Systems Architecture/390, Principles of Operation, Document No. SA22–7201–04, File No. S390–01, (c) IBM Corp. 1990, 1991, 1993, 1994, 1996 (only Chapter 11 provided).

* cited by examiner

Primary Examiner—Robert W. Beausoliel, Jr.
Assistant Examiner—Bryce P. Bonzo
(74) Attorney, Agent, or Firm—David W. Victor; Konrad Raynes & Victor

(57) ABSTRACT

Disclosed is a system for handling errors. A system managed by a processor processes an error in the system. The system then generates an interrupt to the processor indicating that an error occurred and executes an error mode before the processor interprets the interrupt. As part of the error mode, the system prevents data from transferring between the system and the processor and processes a read request from the processor to the system by returning data to the processor unrelated to the requested data. The processor would then process the interrupt indicating the error and execute a diagnostic mode to diagnose the error in the system.

31 Claims, 5 Drawing Sheets

ERROR HANDLING BETWEEN A PROCESSOR AND A SYSTEM MANAGED BY THE PROCESSOR

BACKGROUND OF THE INVENTION

1. Field of the Invention

The present invention relates to a method and system for handling errors in a system managed by a processor and, in particular, a system for handling errors in a bridge system interfacing the processor with an external device, such as a computer system.

2. Description of the Related Art

The Peripheral Component Interconnect (PCI) bus is a high-performance expansion bus architecture that was designed to replace the traditional ISA (Industry Standard Architecture) bus. A processor bus master communicates with the PCI local bus and devices connected thereto via a PCI Bridge. This bridge provides a low latency path through which the processor may directly access PCI devices mapped anywhere in the memory or I/O address space. The bridge may optionally include such functions as data buffering/posting and PCI central functions such as arbitration. The architecture and operation of the PCI local bus is described in "PCI Local Bus Specification," Revisions 2.0 (April, 1993) and Revision 2.1s, published by the PCI Special Interest Group, 5200 Elam Young Parkway, Hillsboro, Oreg., which publication is incorporated herein by reference in its entirety.

A PCI to PCI bridge provides a connection path between two independent PCI local busses. The primary function of the bridge is to allow transactions between a master on one PCI bus and a target device on another PCI bus. The PCI Special Interest Group has published a specification on the architecture of a PCI to PCI bridge in "PCI to PCI Bridge Architecture Specification," Revision 1.0 (Apr. 10, 1994), which publication is incorporated herein by reference in its entirety. This specification defines the following terms and definitions:

initiating bus—the master of a transaction that crosses a PCI to PCI bridge is said to reside on the initiating bus.

target bus—the target of a transaction that crosses a PCI to PCI bridge is said to reside on the target bus.

primary interface—the PCI interface of the PCI to PCI bridge that is connected to the PCI bus closest to the CPU is referred to as the primary PCI interface.

secondary interface—the PCI interface of the PCI to PCI bridge that is connected to the PCI bus farthest from the CPU is referred to as the secondary PCI interface.

downstream—transactions that are forwarded from the primary interface to the secondary interface of a PCI to PCI bridge are said to be flowing downstream.

upstream—transactions forwarded from the secondary interface to the primary interface of a PCI to PCI bridge are said to be flowing upstream.

The PCI architecture provides for the detection and signaling of both parity and other system errors. The error reporting chain from target to bus master to device driver and eventually to the operating system is intended to allow error recovery operations to be implemented at any level. The generation of the SERR signal could generate an NMI, high priority interrupt signal. The SERR signal is generally used to signal address parity errors and/or other non-parity errors. Any PCI agent can set the SERR error by setting a bit in the configuration space register, such as the Status register.

The PCI bridge must detect address parity errors for all transactions on either a primary or secondary interface. The PCI bridge reports the error by asserting the SERR signal and propagating the SERR signal upstream. For instance, if the bridge detects an address parity error on the primary or secondary interface, the bridge asserts the SERR signal on the primary interface, sets the SERR bit in the Status register, sets a Detected Parity Error bit in either the Status register or Secondary Status register and may signal a target abort by setting a target abort signal register. Another error is the PERR or parity error that the PCI bridge uses to signal a data parity error.

The agent detecting an error may also terminate with a master abort mode by setting a master abort bit. When a read transaction with an address parity error crosses a PCI to PCI bridge and is terminated by a master abort, the bridge will return FFFF FFFFh to the initiator and terminate the read transaction on the initiating bus. When a write transaction is terminated with a master abort, the bridge will complete the write transaction on the initiating bus and discard the write data.

In current systems, a processor functions as the master that controls the PCI to PCI bridge system. One problem with current systems is that when the master processor attached to the PCI system receives an SERR, PERR or other error signal, the operating system of the processor enters a machine check handling mode to diagnose and check the error. However, upon entering the machine check handling mode, the processor would hang-up because the machine check handling logic is designed to handle errors in the processor and is typically not capable of diagnosing errors generated from an external system, such as a PCI to PCI bridge network. Because the machine check handling mode for the processor cannot process an error from the external PCI bridge system, the processor system will hang-up and crash. As a result of this crash, data maybe be lost and the system will be down while the processor is rebooting. In large scale systems, such as the IBM 3990 storage controller which manages critical data, rebooting can take up to twenty minutes. The loss of data and down time resulting from having to reboot the system can be especially costly for such storage controllers that manage critical data. Machine check handling for storage controllers is described in IBM publication "ESA/390 Principles of Operation," document no. SA22-7201-04 (Copyright IBM Corp. 1990, 1991, 1993, 1994, 1996, 1997), which publication is incorporated herein by reference in its entirety.

Moreover, there is typically a delay time from when an error is generated to when the processor interprets the error interrupt to perform error diagnosis and correction operations. During this delay, the processor may be processing numerous input/output (I/O) requests. Such I/O processing could cause further errors and problems to propagate through the PCI to PCI bridge system before the processor proceeds to address the error.

SUMMARY OF THE PREFERRED EMBODIMENTS

To overcome the limitations in the prior art described above, the preferred embodiments disclose a system for handling errors. A system, managed by a processor, processes an error. The system then generates an interrupt to the processor indicating that an error occurred and executes an error mode before the processor interprets the interrupt. As part of the error mode, the system prevents data from transferring between the system and the processor and the system processes a read request from the processor by returning data to the processor that is unrelated to the requested data. The processor would then process the interrupt indicating the error, and execute a diagnostic mode to diagnose the error in the system.

In further embodiments, the system prevents data from transferring between the system and processor by discarding data transferred therebetween. In still further embodiments, the processor, in the diagnostic mode, reads configuration registers in the system to diagnose the error.

In this way, preferred embodiments provide a system for handling errors generated within the system by allowing the processor to continue executing I/O interrupts and other tasks until processing the interrupt generated for the error. Moreover, further embodiments prevent data flowing between the system and the processor to prevent further errors from propagating through the system. Still further embodiments provide a diagnostic mode in which the processor diagnoses errors in the system.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof and which illustrate several embodiments of the present invention. It is understood that other embodiments may be utilized and structural changes may be made without departing from the scope of the present invention.

Hardware and Software Environment

Figure 1:
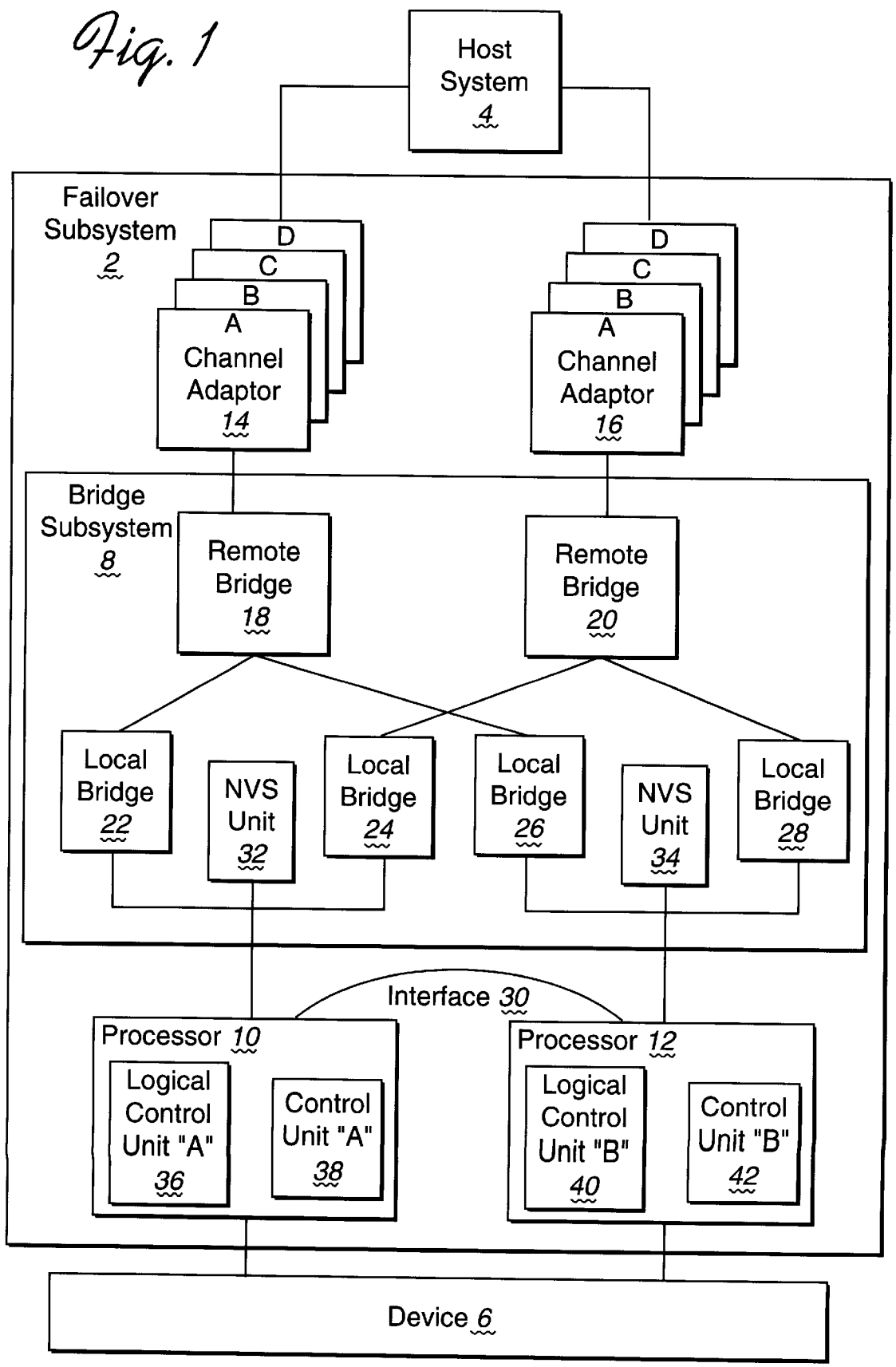
FIG. 1 is a block diagram illustrating a software and hardware environment in which preferred embodiments of the present invention are implemented.

FIG. 1 illustrates a hardware environment in which preferred embodiments are implemented. A failover subsystem 2 provides data communication paths between a host system 4 and a device 6. In preferred embodiments, the failover subsystem 2 includes a bridge subsystem 8 that allows either processor 10, 12 to communicate with and configure channel adaptors 14A, B, C, D and 16A, B, C, D. The bridge subsystem 8 further allows either processor 10, 12 to operate as a master of the bridge subsystem 8. In alternative embodiments, the bridge subsystem 8 could be used to allow processors 10, 12 to communicate with devices other than channel adaptors 14, 16 including any device that typically communicates over a bus to a processor. In the embodiment of FIG. 1, each set of channel adaptors 14, 16 is comprised of four channel adaptor cards A, B, C, D that are each connected via a slot to a remote bridge 18, 20. Each channel adaptor card A, B, C, D provides a connection to one or more host systems.

The device 6 may be a direct access storage device (DASD) or other subsystem. Related co-pending and commonly assigned U.S. Patent Applications: "Failure System for a Multiprocessor Storage Controller," by Brent C. Beardsley, Matthew J. Kalos, Ronald R. Knowlden, Ser. No. 09/026,622, filed on Feb. 20, 1998; and "Failure and Failback System for a Direct Access Storage Device," by Brent C. Beardsley and Michael T. Benhase, Ser. No. 08/988,887, filed on Dec. 11, 1997, both of which applications are incorporated herein by reference in their entirety, describe the use of a failover subsystem providing communication paths between a host system and a string of DASDs.

As illustrated in FIG. 1, the bridge subsystem 8 includes two remote bridges 18, 20. Remote bridge 18 is connected to local bridges 22, 26 and remote bridge 20 is connected to local bridges 24, 28. The failover subsystem 2 is comprised of two sides. One side includes channel adaptors 14, remote bridge 18, local bridges 22, 24, and processor 10. The other side similarly includes channel adaptors 16, remote bridge 20, local bridges 26, 28, and processor 12. These sides allow each set of channel adaptors 14, 16 to communicate with each processor 10, 12. Channel adaptors 14A, B, C, D communicate with processor 10 via remote bridge 18 and local bridge 22 and with processor 12 via remote bridge 18 and local bridge 26. Channel adaptors 16A, B, C, D communicate with processor 10 via remote bridge 20 and local bridge 24 and with processor 12 via remote bridge 20 and local bridge 28. The host system 4 shown in FIG. 1 is a dual host system known in the art. For instance, if the host system 4 is connected to channel adaptor 14A and channel adaptor 16A, then the host system 4 may select from either of the two channel adaptors 14A, 16A to communicate with the processors 10, 12 and device 6 below.

The processors 10 and 12 may communicate via an interface 30, which may be an $I^2C$ interface, Ethernet or any other suitable interface known in the art or another bridge subsystem 8. The processors 10, 12 can detect a failure of the other processor via the interface 30.

A non-volatile storage (NVS) unit 32, 34 is linked to each path between each pair of local bridges 22, 24 and 26, 28. In preferred embodiments, local busses could be used to interconnect the bridge components 18, 20, 22, 24, 26, 28 within the bridge subsystem 8 to any downstream or upstream device, thereby providing primary and secondary interfaces, wherein any bridge component or device linked thereto may be the initiating or targeting bus. For instance, a local bus could interconnect remote bridge 18 with local bridges 22, 26, a local bus could interconnect local bridges 22, 24, NVS unit 32, and processor 10, and a local bus could interconnect channel adaptors 14 with remote bridge 18. Similarly, a local bus could interconnect remote bridge 20 with local bridges 24, 28, a local bus could interconnect local bridges 26, 28, NVS unit 34, and processor 12, and a local bus could interconnect channel adaptors 16 with remote bridge 20. In yet further embodiments, any number of combinations of local busses could provide interconnection between the components of the bridge subsystem 8, processors 10, 12, and channel adaptors 14, 16.

Processor 10 may further include a logical control unit "A" 36 and a control unit "A" 38 and processor 12 may further include a logical control unit "B" 40 and a control unit "B" 42.

Figure 2:
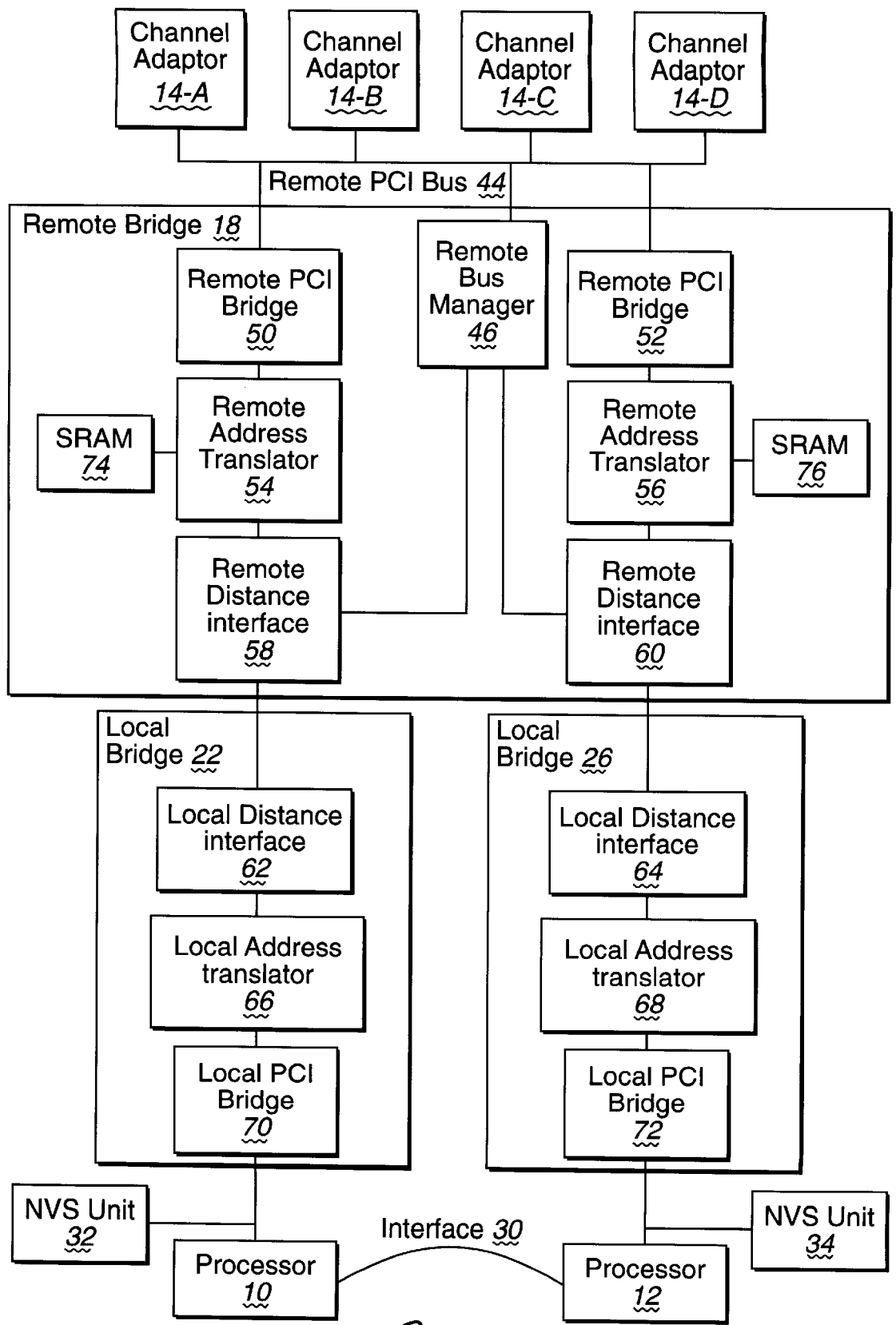
FIG. 2 illustrates further details of the preferred embodiments described with respect to FIG. 1.

FIG. 2 provides further detail of one-half of the bridge subsystem 8, including remote bridge 18 and local bridges 22, 26, that allows the processors 10, 12 to communicate with channel adaptors 14. The same configuration would apply to the other half of the bridge 8 and failover 2 subsystems, including channel adaptors 16, remote bridge 20, local bridges 24, 28, and processors 10, 12.

Remote bridge 18 includes a remote PCI bus 44. A remote bus manager 46 manages data and signals presented on the remote PCI bus 44. The remote bus manager 46 performs arbitration functions for the bus 44 and maps data and control signals presented by the channel adaptors 14, 16 to an address in the PCI address space. The remote bus manager 46 may be comprised of a hardwired control unit or a microprocessor. Remote bridge 18 includes two sides, each side having a remote PCI bridge 50, 52, a remote address translator 54, 56, a remote distance interface 58, 60, and a static random access memory (SRAM) 74, 76 or other suitable memory device known in the art. Remote PCI bridge 50, remote address translator 54 and remote distance interface 58 provide communication between channel adaptors 14 and local bridge 22. Remote PCI bridge 52, remote address translator 56 and remote distance interface 60 provide communication between channel adaptors 14 and local bridge 26.

The channel adaptors 14A, B, C, D communicate with either remote PCI bridge 50, 52 via the remote PCI bus 44. Remote PCI bridges 50, 52 may be comprised of PCI bridge chips known in the art or any other suitable type of bridge chip which is capable of performing the functions discussed herein. The remote 58, 60 and local 62, 64 distance interfaces include controls and buffers known in the bridge art to control transactions between the remote bridge 18 and the local bridges 22, 26 and provide for long distance communication therebetween.

Each local bridge 22, 26 includes, respectively, a local distance interface 62, 64, a local address translator 66, 68, and a local PCI bridge 70, 72. The remote 54, 56 and local 66, 68 address translators include circuitry known in the art to map a received address to another address space. Remote address translators 54, 56 may perform address translation by accessing an address translation map maintained in SRAM 74, 76, respectively. For instance, remote address translators 54, 56 would map an address provided by channel adaptors 14 to the address space of the local PCI bridges 70, 72, respectively. Local address translators 66, 68 would map an address from the local PCI bridges 70, 72 to the address space of the remote PCI bridges 50, 52, respectively. The remote 54, 56 and local 70, 72 address translators also include data buffer control circuitry known in the art to transmit data and address information. For instance, after local address translator 66, 68 translates an address received from the local PCI bridge 70, 72 to the remote PCI bridge 50, 52 address space, this translated address is transmitted to the remote address translator 54, 56 via the local 62, 64 and remote 58, 60 distance interfaces. In such case, the remote address translator 54, 56 may buffer and transmit this received address to the remote PCI bridge 50, 52 without performing further translation. Likewise, after remote address translator 54, 56 translates an address received from the remote PCI bridge 50, 52 to the address space of the local PCI bridge 70, 72, respectively, this translated address is transmitted to the local address translator 66, 68 via the remote 58, 60 and local 62, 64 distance interfaces. In such case, the local address translator 66, 68 may buffer and transmit this received address to the local PCI bridge 70, 72 without performing further translation.

The components and configuration of remote bridge 20 and local bridges 24, 28 that provide communication paths between channel adaptors 16 and processors 10, 12 are identical to that of the remote bridge 18 and local bridges 22, 26 discussed above.

Further details of the preferred bridge subsystem 8 embodiment which allows either processor 10, 12 to function as the master of the bridge subsystem 8 is described in copending and commonly assigned IBM patent application, entitled "Bridge Failover System," Ser. No. 09/026,620, by Brent C. Beardsley, Carl E. Jones, and Forrest L. Wade, filed on Feb. 20, 1998, which application is incorporated herein by reference in its entirety.

Error Handling

Figure 3:
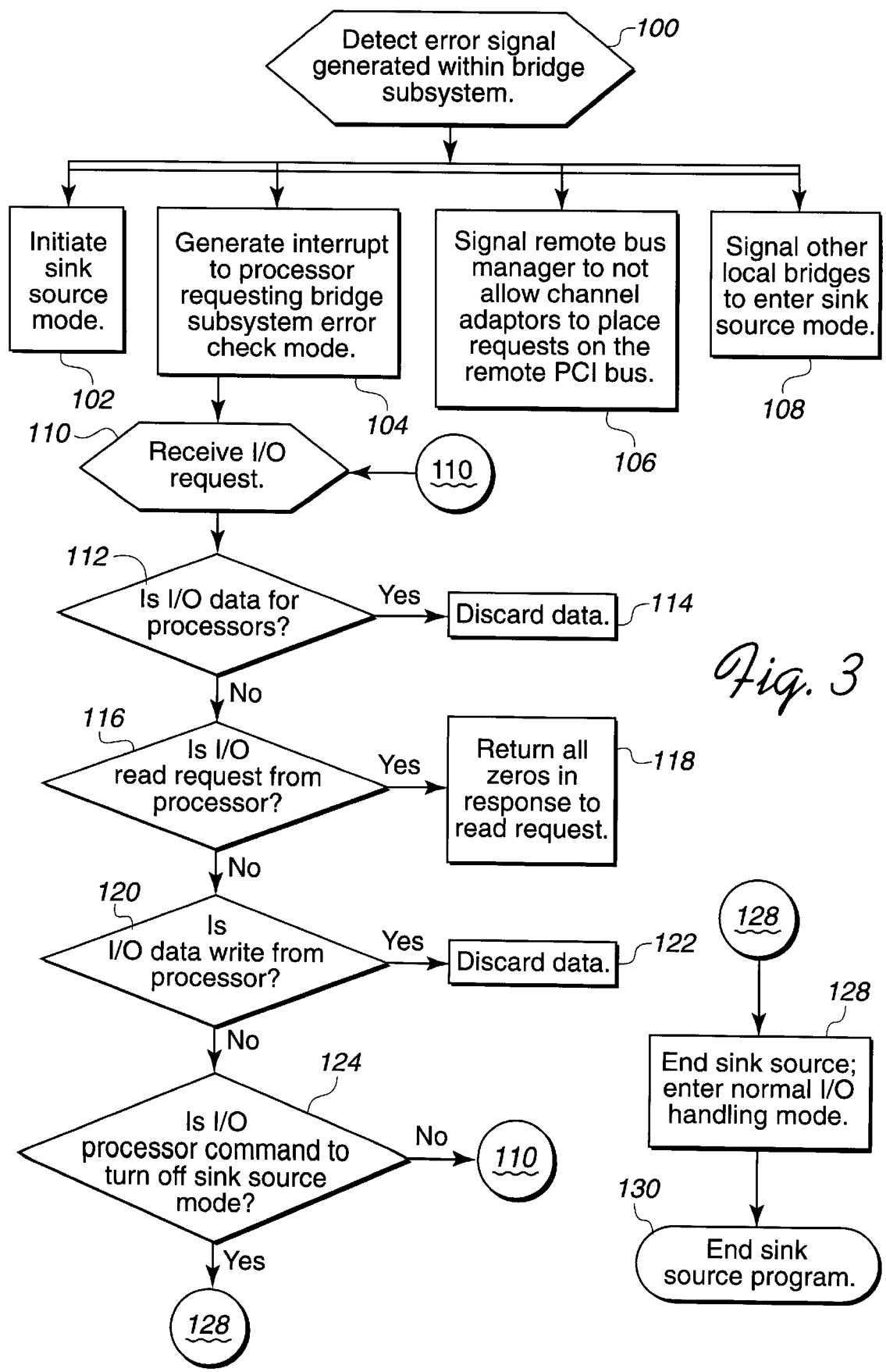
FIG. 3 illustrates logic implemented in the bridge subsystem to handle errors generated within the bridge subsystem in accordance with preferred embodiments of the present invention.

FIG. 3 illustrates logic implemented in the hardware state sequencing, i.e., hardwired logic, of the local bridges 22, 24, 26, 28 to handle errors generated within the bridge subsystem 8, such as SERR, PERR or any other internal error indication, including PCI or non-PCI type errors. Control begins at block 100 which represents a local bridge, e.g., local bridge 22, detecting an error signal indicating an error within the bridge subsystem 8. In preferred embodiments, each processor 10, 12 is responsible for managing certain of the system resources. For instance, processor 10 may be responsible for local bridges 22, 24, remote bridge 18, and channel adaptors 14A, B, C, D; whereas processor 12 may be responsible for local bridges 26, 28, remote bridge 20 and channel adaptors 16A, B, C, D.

Control then transfers to blocks 102, 104, 106, and 108, which the local bridge 22 may execute in parallel. At block 102, the local bridge 22 initiates a sink source mode to handle the error. The local bridge 22 executes logic to function as a "sink" for data that comes from or would otherwise go to the processor 10, i.e. the local bridge 22 sinks data provided by the processor 10 or provides meaningless data to the processor. At block 104, the local bridge 22 generates a normal interrupt on a local PCI bus to the attached processor 10 requesting the processor to enter a special error checking mode to handle errors in the bridge subsystem 8. At block 106, the local bridge 22 signals the remote bus manager 46 to not allow the channel adaptors 14A, B, C, D managed by the same processor that manages the local bridge 22, i.e., processor 10, to place requests on the remote PCI bus 44. At block 108, local bridge 22 signals the other local bridges through remote bridges to enter the sink source mode. In response to such signal, local bridges 26, 28 would execute the logic of FIG. 3 to enter sink source mode processing for the resources managed by the other processor 12.

From block 104, control transfers to block 110 which represents the local bridge 22 receiving an I/O request or processor command in the sink source mode. At block 112, the local bridge 22 determines whether the I/O request concerns data within the bridge subsystem 8 directed to the processor 10, e.g., data communicated from the channel adaptors 14A, B, C, D before the remote bus manager 46 was instructed to not allow the channel adaptors 14A, B, C, D to place interrupts on the remote PCI bus 44. If so, control transfers to block 114 to discard the data. Otherwise, control transfers to block 116 which represents the local bridge 22 determining whether the I/O request is a read request from the processor 10. If so, control transfers to block 118 which represents the local bridge 22 returning all zeros to the processor 10 as a response to the read request. Alternatively, the local bridge 22 could return any "innocuous data," which is data that is meaningless, unrelated to the requested data or that would not cause the processor 10 to take further action. For instance, upon processing the "innocuous data," the processor 10 would not proceed as if it had interpreted an end of operation signal. If the I/O operation is not a read request, control transfers to block 120 which represents the local bridge 22 determining whether the I/O request is a write request, including data to write, from the processor 10. If so, control transfers to block 122 to discard the write data. Otherwise, control transfers to block 124 which represents the local bridge 22 determining whether the I/O request is a command from the processor 10 to turn off the sink source mode. The processor 10 would signal the local bridge 22 to turn off the sink source mode after processing the normal interrupt indicating the error. If not, control transfers to block 110 to wait for the next I/O or processor command to process. Other logic may be included to process other types of I/O requests and commands not enumerated at blocks 112 through 124.

If the I/O request is a command from the processor 10 to turn off the sink source mode, then control transfers to block 128 which represents the local bridge 22 turning off the sink source mode and handling I/O requests in a normal manner. In preferred embodiments, the processors 10, 12 may signal their respective local bridges 22, 24, 26, 28 to end sink source mode asynchronously, depending on when the processor 10, 12 processes the interrupt identifying the error. Thus, certain local bridges may end sink source mode while others are still processing I/O requests in the sink source mode. As discussed, each processor manages a set of resources in the bridge subsystem 8. For instance, local bridges 22, 24 handle I/O requests for processor 10. When processor 10 processes the error interrupt, processor 10 would signal local bridges 22, 24 to end the sink source mode and allow channel adaptors 14A, B, C, D to generate interrupts on the remote bus. Likewise, local bridges 26, 28 handle I/O requests for processor 12 according to the sink source mode of blocks 112–124; when processor 12 processes the error interrupt, processor 12 would signal local bridges 26, 28 to end the sink source mode and allow channel adaptors 16A, B, C, D to generate interrupts on the remote bus.

During sink source mode, the local bridges 22, 24, 26, 28 prevent the normal completion of I/O operations concerning the processors 10, 12. However, the processors 10, 12 still execute the tasks even though the tasks do not complete. When the errors are diagnosed and processed, the I/O operations that failed to complete may be retried.

Figure 4:
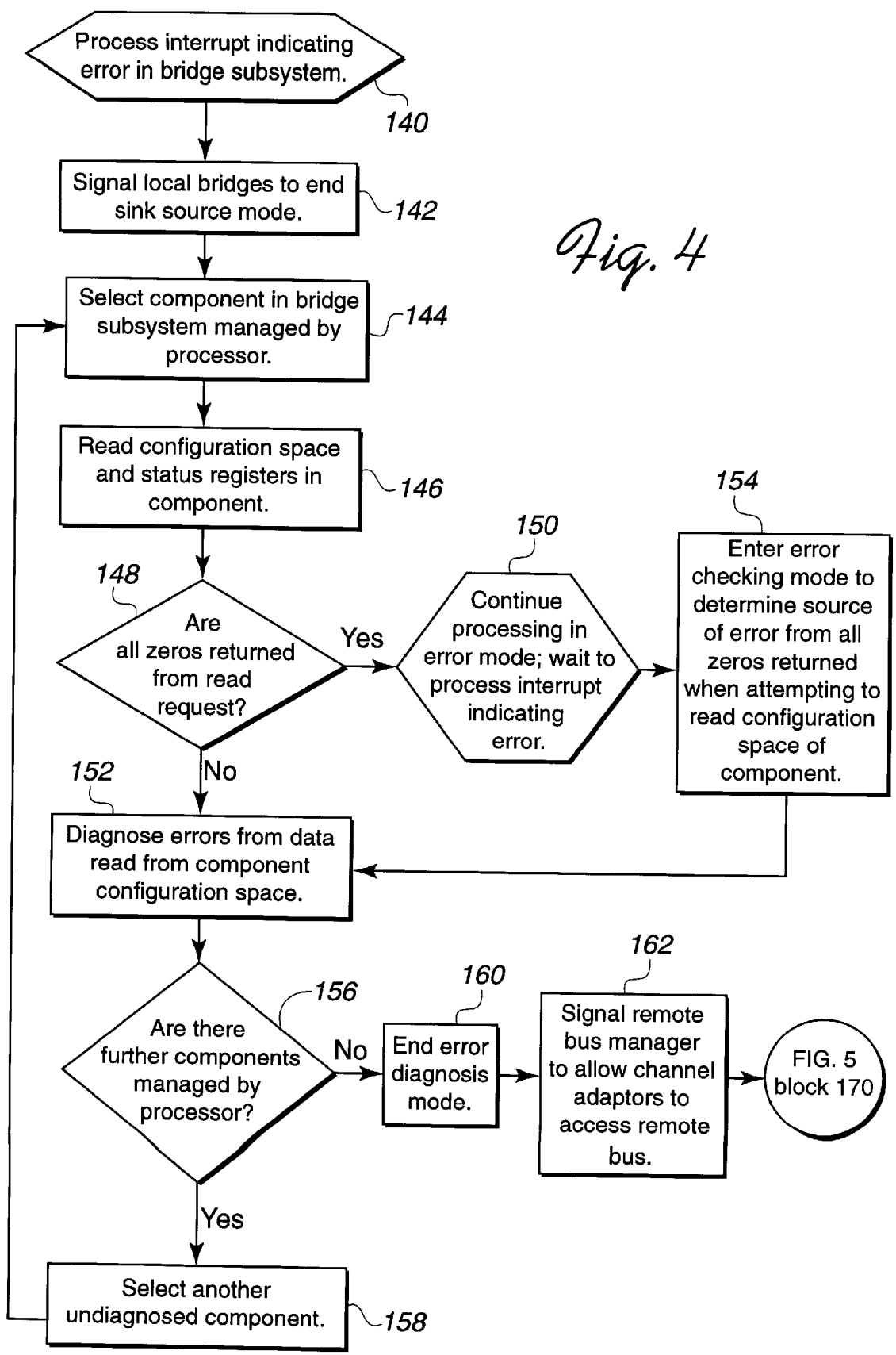
FIG. 4 illustrates logic implemented in the processor to handle errors generated within the bridge subsystem in accordance with preferred embodiments of the present invention.

FIG. 4 illustrates logic executed by the processors 10, 12 to perform error checking for errors that originate within the bridge subsystem 8. This logic may be implemented in the functional application layer or the operating system the processors 10, 12 are executing. Control begins at block 140 which represents a processor, e.g., processor 10, processing an interrupt indicating an error within the bridge subsystem 8. This interrupt was generated by the local bridge 22 at block 104 in FIG. 3. Control transfers to block 142 which represents the processor 10 signaling the local bridges 22, 24 to end sink source mode. The local bridges 22, 24 would process this command at block 124 in FIG. 3. Control then transfers to block 144 which represents the processor 10 selecting a component in the bridge subsystem 8 managed by the processor 10 to diagnose. In preferred embodiments, the error checking code would provide the processor 10 with a configuration map of the resources in the bridge subsystem 8 managed by the processor 10. For instance, the processor 10 may first perform error checking of the components within local bridge 22.

After selecting a component in the bridge subsystem 8, control transfers to block 146 which represents the processor 10 initiating a read request to read the configuration space and status registers in the selected component. The status registers may reside outside the configuration space in memory. Control transfers to block 148 which represents the processor 10 determining whether all zeros, i.e., innocuous data, were returned from the read request. The return of all zeros during error handling mode indicates that the component to which the read request was directed at block 148 may be the source of the error that triggered the local bridge 22 to initiate sink source operations. If so, control transfers to block 150; otherwise, control transfers to block 152. Block 150 represents the processor 10 continuing to perform error diagnosis operations until processing the interrupt indicating an error generated during the error correction mode. Control then transfers to block 154 which represents the processor 10 entering a further error checking mode to determine the source of the error from the returned zeros. In this way, when the processor 10 reads a failed component within the bridge subsystem 8 during error recovery, the error generated from the failed component will not cause the processor 10 to crash and reboot during error recovery. Instead, the processor 10 will determine the source of the error and failed device that caused the return of all zeros.

From blocks 148 or 154, control transfers to block 152 which represents the processor 10 diagnosing the errors from the data read from the component configuration space, including all zero data indicating that the device the processor 10 attempted to diagnose failed. In this way, multiple instances of sink source may be generated while the processor 10 is within the error diagnosis and recovery mode if the attempt to diagnose the error causes the diagnosed component to generate an error signal, such as SERR or PERR. Control then transfers to block 156 which represents the processors 10 examining the configuration map to determine whether the processor 10 manages any further components in the bridge subsystem 8 that have not been diagnosed. If so, control transfers to block 158 to select an undiagnosed component in the bridge subsystem and then proceed back to block 144 et seq. to diagnose the selected component. If there are no further components in the bridge subsystem 8 managed by the processor 10, then control transfers to block 160 to end the diagnosis. After ending the diagnosis, control transfers to block 162 which represents the local bridge 22 signaling the remote bus manager 46 to allow the channel adaptors managed by the local bridge 22 to place requests on the remote PCI bus 44. In this way, the system is quiesced during error diagnosis. Control then proceeds toward error correction and recovery at block 170 in FIG. 5.

Figure 5:
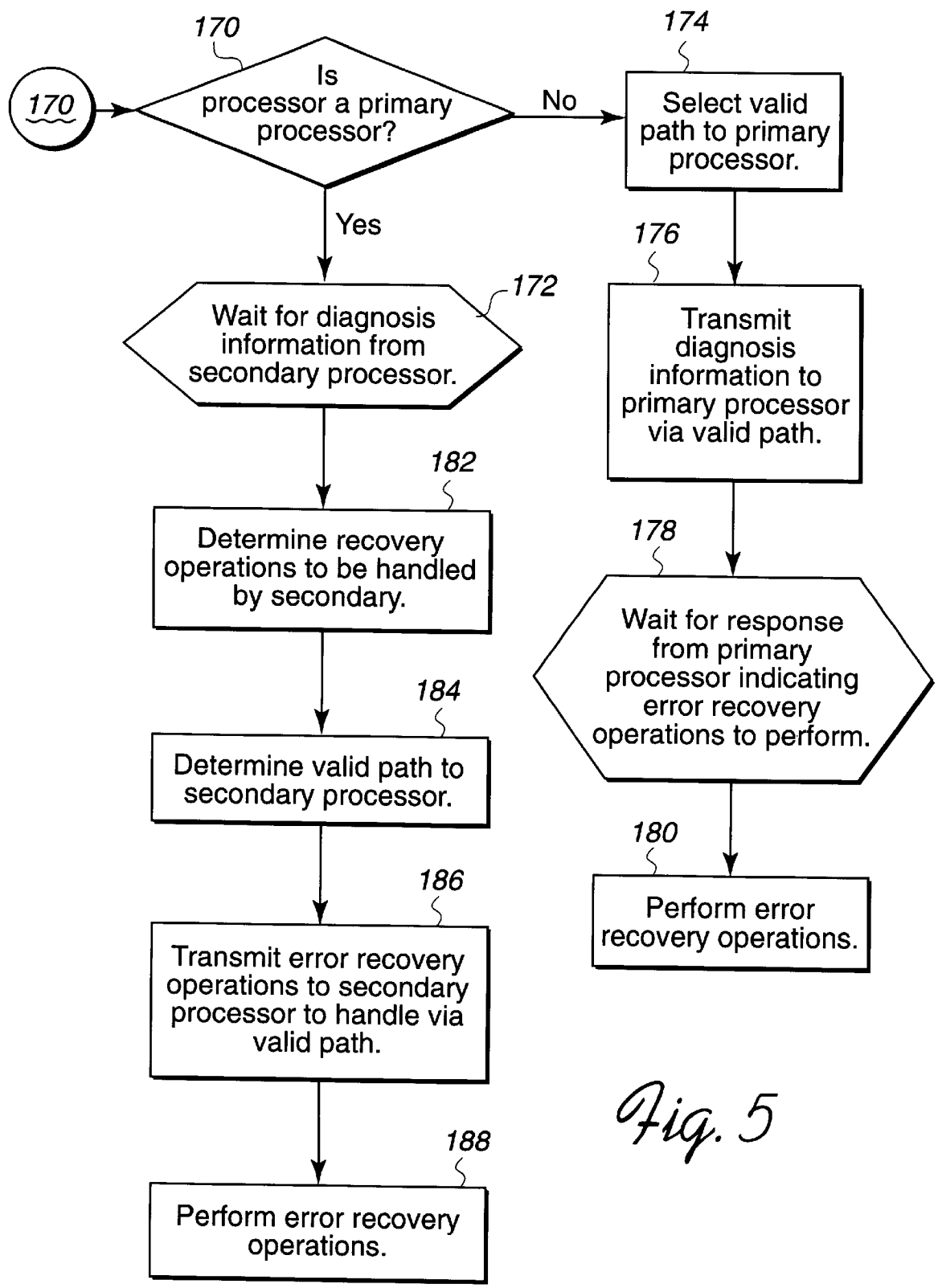
FIG. 5 illustrates logic implemented in the processors to perform diagnosis and recovery operations in accordance with preferred embodiments of the present invention.

FIG. 5 illustrates logic implemented in the processors 10, 12 to perform error recovery after diagnosing errors in the components managed by the processors 10, 12. Control begins at block 170 which represents the processor, e.g., processor 10, after completing the diagnosis of the managed components, determining whether the processor is the master of the bridge subsystem 8, i.e., the primary processor. If so, control transfers to block 172; otherwise, if the processor 10 is a secondary processor, control transfers to block 174. At block 174, the processor 10 selects a valid path through the bridge subsystem 8 to the other processor 12. The processor 10 would have determined a valid path after diagnosing the bridge subsystem 8 components it manages to determine a path of operational remote and local bridge components. After selecting a valid path, control transfers to block 176 which represents the processor 10 transmitting the diagnosis information on the bridge subsystem 8 components processor 10 manages and diagnosed at blocks 142–160 in FIG. 4 to processor 12 via the selected valid path. Control then transfers to block 178 which represents the processor 10 waiting for a response from the primary processor 12 indicating the error recovery operations to perform. After receiving the message from the primary processor 12, control transfers to block 180 which represents the processor 10 performing the error recovery operations according to the instructions provided by the primary processor 12.

If the processor 10 is the primary processor, i.e., the master of the bridge subsystem 8, then control transfers to block 172 which represents the processor 10 waiting for diagnosis information from the secondary processor 12. After receiving the diagnosis information, control transfers to block 182 which represents the primary processor I/O determining the recovery operations to be handled by the secondary processor 12. Control then transfers to block 184 which represents the primary processor 10 determining a valid path through the bridge subsystem 8 to the secondary processor 12 based on the diagnosis information indicating the valid subcomponents, e.g., remote and local bridges, in the bridge subsystem 8. At block 186, the processor 10 then transmits the error recovery operation information to the secondary processor 12 via the selected data path. At block 188, the primary processor 10 then performs error recovery operations on the components in the bridge subsystem 8 managed by processor 10.

The error recovery operations mode may be implemented in accordance with error recovery operations known in the art in conformance with the architecture of the bridge subsystem 8. In preferred embodiments, the primary processor maintains information on the architecture and set-up of the entire bridge subsystem 8 and determines error recovery operations that the secondary processor(s) will perform on the components of the bridge subsystem 8 the secondary processor(s) manages.

Alternative Embodiments and Conclusions

This concludes the description of the preferred embodiments of the invention. The following describes some alternative embodiments for accomplishing the present invention.

The logic of the preferred embodiments was described with respect to the bridge subsystem 8 shown in FIGS. 1 and 2. However, in alternative embodiments, the preferred error handling logic could be used regardless of the type of system managed by the processor that is generating the errors. Thus the bridge subsystem may be any subsystem, including a PCI—PCI bridge subsystem. For instance, the preferred embodiment of allowing the processor to complete processing interrupts until a normal interrupt indicating an error is processed can be applied to any processor and subsystem managed by the processor. Thus, the preferred embodiments for handling errors propagated in a separate system external to a processor are not limited to the particular embodiments disclosed herein.

Preferred embodiments are especially suited for bypassing an operating system's machine check handler mode when the propagation of the error to the operating system's machine check handler would cause the system to crash. The preferred embodiments provide a mechanism for transmitting the error via a normal interrupt to cause the operating system to execute a special error recovery mode designed to handle errors propagated from the subsystem, regardless of the architecture or function of the subsystem. Thus, the bridge subsystem 8 may be any subsystem known in the art, including known PCI—PCI bridge systems or any other system to interface the processor(s) with an external I/O device.

The logic of FIGS. 3, 4, and 5 may be implemented as firmware or software. Moreover, the ordering of the steps for FIGS. 3–5 are for illustrative purposes. In alternative embodiments, the steps may be performed in a different order than that disclosed. Further, steps may be removed or added to the logic.

Preferred embodiments were described as including a dual processor system. However, in alternative embodiments, only one or more than two processor complexes may be involved in the error handling operations.

The preferred embodiments may be implemented as a method, apparatus or article of manufacture using standard programming and/or engineering techniques to produce software, firmware, hardware, or any combination thereof. The term "article of manufacture" (or alternatively, "computer program product") as used herein is intended to encompass one or more computer programs and data files accessible from one or more computer-readable devices, carriers, or media, such as a magnetic storage media, "floppy disk," CD-ROM, a file server providing access to the programs via a network transmission line, holographic unit, etc. Of course, those skilled in the art will recognize many modifications may be made to this configuration without departing from the scope of the present invention.

In summary, disclosed is a system for handling errors. A system managed by a processor processes an error. The system then generates an interrupt to the processor indicating that an error occurred and executes an error mode before the processor interprets the interrupt. As part of the error mode, the system prevents data from transferring between the system and the processor and the system processes a read request from the processor by returning data to the processor unrelated to the requested data. The processor would then process the interrupt indicating the error, and execute a diagnostic mode to diagnose the error in the system.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for handling errors, comprising the steps of:
   processing an error in a system managed by a processor;
   generating, with the system, an interrupt to the processor indicating that an error occurred;
   executing an error mode with the system before the processor interprets the interrupt by preventing data from transferring between the system and the processor and by processing a read request from the processor by returning data to the processor unrelated to the requested data;
   processing, with the processor, the interrupt indicating the error; and
   executing a diagnostic mode, with the processor, to diagnose the error in the system.

2. The method of claim 1, wherein after processing the interrupt, signaling, with the processor, the system to stop preventing data from transferring between the system and the processor and stop returning unrelated data in response to read requests from the processor.

3. The method of claim 1, wherein the step of preventing the transfer of data between the system and processor comprises the system discarding data transmitted therebetween.

4. The method of claim 1, wherein the processor processes previously generated interrupts before processing the interrupt indicating the error.

5. The method of claim 1, wherein in the diagnostic mode, the processor reads configuration registers in the system to diagnose the error, further comprising the step of executing an error recovery mode to correct the error.

6. The method of claim 5, further comprising the steps of:
detecting an error, with the system, in response to the processor attempting to read configuration registers during diagnosis;
executing, with the system, the error mode and returning unrelated data to the processor in response to detecting the error from the processor attempting to read the configuration registers during diagnosis; and
processing, with the processor, the unrelated data to determine the source of the error resulting from the read request to diagnose the system.

7. The method of claim 1, wherein the system provides an interface between the processor and a host system, wherein the host system communicates with the system via a bus interface, wherein the step of executing the error mode further comprises the system preventing the host system from generating interrupts on the bus interface during the error mode.

8. The method of claim 1, wherein the system is comprised of a plurality of bridge components including a local bridge, wherein a local bus interfaces the processor to the local bridge, which interfaces the processor to the bridge components in the system, wherein the step of generating the interrupt to the processor comprises the local bridge generating the interrupt on the local bus and wherein the local bridge performs the steps of preventing data from transferring between the system and the processor and returning the unrelated data to the processor in response to the read request from the processor.

9. The method of claim 8, wherein the step of executing the diagnostic mode comprises the processor reading status registers in the bridge components in the system to diagnose the source of the error.

10. The method of claim 1, wherein the processor is a first processor and a second processor is in communication with the system, wherein after processing the error, further performing the steps of:
generating, with the system, an interrupt to the second processor indicating an error occurred;
wherein the step of executing the error mode with the system before the second processor interprets the interrupt further comprises preventing data from transferring between the system and the second processor and processing a read request from the second processor to the system by returning the unrelated data to the second processor;
processing, with the second processor, the interrupt indicating the error; and
executing a diagnostic mode, with the second processor, to diagnose the error in the system.

11. The method of claim 10, wherein the first processor manages a first group of components within the system and the second processor manages a second group of components within the system, wherein the steps of the first processor and second processor diagnosing the errors comprises the first processor diagnosing errors in the first group of components and the second processor diagnosing errors in the second group of components.

12. The method of claim 11, wherein the system comprises bridge components including a first and second local bridges, wherein a first local bus interfaces the first processor to a first local bridge and wherein a second local bus interfaces the second processor to a second local bridge, wherein data is communicated to the first processor through the first local bridge and to the second processor through the second local bridge, wherein the step of executing the error mode is performed by the first local bridge, wherein the first local bridge further performs the step of signaling the second local bridge to execute the error mode, and wherein the step of generating the interrupt to the first processor is performed by the first local bridge on the first local bus and the step of generating the interrupt to the second processor is performed by the second local bridge on the second local bus.

13. The method of claim 11, wherein the system components include bridge components, wherein the step of executing the diagnostic mode comprises the steps of reading, with the first processor, status registers in the bridge components managed by the first processor and reading, with the second processor, status registers in the bridge components managed by the second processor.

14. The method of claim 10, further comprising the steps of:
transmitting, with the second processor, the diagnosis results for the second group of components to the first processor;
determining, with the first processor, error recovery operations for the first and second processors to correct errors diagnosed in the system components;
transmitting, with the first processor, the error recovery operations for the second processor to the second processor; and
performing, with the first and second processors, the error recovery operations determined by the first processor.

15. A system for error handling, comprising:
a processor;
a system managed by the processor;
logic implemented in the system, comprising:
(i) means for processing an error within the system;
(ii) means for generating an interrupt to the processor indicating that an error occurred; and
(iii) means for executing an error mode before the processor interprets the interrupt by preventing data from transferring between the system and the processor and processing a read request from the processor by returning data to the processor unrelated to the requested data; and
program logic executed by the processor, comprising:
(i) means for processing the interrupt indicating the error; and
(ii) means for executing a diagnostic mode to diagnose the error in the system.

16. The system of claim 15, wherein the program logic executed by the processor further comprises means for signaling the system to stop preventing data from transferring between the system and the processor and stop returning unrelated data in response to read requests from the processor after processing the interrupt.

17. The system of claim 15, wherein the logic implemented within the system for preventing data from transferring between the processor and the system comprises discarding data transmitted therebetween.

18. The system of claim 15, wherein the processor processes previously generated interrupts before processing the interrupt indicating the error.

19. The system of claim 15, wherein the program logic further comprises means for reading configuration registers in the system to diagnose the error and means for executing error recovery mode to correct the error.

20. The system of claim 19, wherein the logic implemented in the system further comprises means for detecting an error in response to the processor attempting to read configuration registers during diagnosis and means for executing the error mode and returning unrelated data to the processor in response to detecting the error from the processor attempting to read the configuration registers during diagnosis, and wherein the program logic implemented in the processor further includes means for processing the unrelated data to determine the source of the error resulting from the read request to diagnose the system.

21. The system of claim 15, further comprising:
   a host system, wherein the system provides an interface between the processor and the host system; and
   a bus interface providing a communication path between the host system and the system, wherein the logic implemented in the system further comprises means for preventing the host system from generating interrupts on the bus interface during the execution of the error mode.

22. The system of claim 15, wherein the system is comprised of a plurality of bridge components including a local bridge, further comprising a local bus interfacing the processor to the local bridge which interfaces the processor to the bridge components in the system, wherein the local bridge generates the interrupt to the processor on the local bus and wherein the local bridge prevents data from transferring between the system and the processor and returns the unrelated data to the processor in response to the read request from the processor.

23. The system of claim 22, wherein the program logic executed by the processor further comprises means for reading status registers in the bridge components in the system to diagnose the source of the error.

24. The system of claim 15, wherein the processor is a first processor, further comprising:
   a second processor in communication with the system, wherein the program logic executed by the first processor further comprises means for generating an interrupt to the second processor indicating an error occurred;
   wherein the logic implemented in the system prevents data from transferring between the system and the second processor and processes a read request from the second processor to the system by returning the unrelated data to the second processor during error mode; and
   program logic implemented in the second processor, comprising means for processing the interrupt indicating the error and means for executing a diagnostic mode to diagnose the error in the system.

25. The system of claim 24, wherein the first processor manages a first group of components within the system and the second processor manages a second group of components within the system, wherein the program logic implemented in the first processor further includes means for diagnosing errors in the first group of components and wherein the program logic implemented in the second processor further includes means for diagnosing errors in the second group of components.

26. The system of claim 25, further comprising:
   bridge components in the system, including a first local bridge and a second local bridge;
   a first local bus providing communication between the first processor and the first local bridge, wherein data is communicated to the first processor through the first local bridge; and
   a second local bus providing communication between the second processor and the second local bridge, wherein data is communicated to the second processor through the second local bridge, wherein the logic for executing the error mode is implemented in the first local bridge, wherein the logic implemented in the first local bridge further comprises means for signaling the second local bridge to execute the error mode, and wherein the first local bridge includes logic for generating the interrupt to the first processor on the first local bus and wherein the second bridge includes program logic for generating the interrupt to the second processor on the second local bus.

27. The system of claim 25, wherein the system components include bridge components, wherein the program logic executed by the first processor for executing the diagnostic mode comprises means for reading status registers in the bridge components managed by the first processor and wherein the program logic executed by the second processor further comprises means for reading status registers in the bridge components managed by the second processor.

28. The system of claim 24, wherein the program logic executed by the first processor further comprises:
   (i) means for receiving diagnosis results for the second group of components;
   (ii) means for determining error recovery operations for the first and second processors to correct errors diagnosed in the system components;
   (iii) means for transmitting the error recovery operations for the second processor to the second processor; and
   (iv) means for performing error recovery operations determined by the first processor for the first processor; and
   wherein the program logic executed by the second processor further comprises:
   (i) means for transmitting the diagnosis results for the second group of components to the first processor; and
   (ii) means for performing the error recovery operations determined by the first processor.

29. An article of manufacture for use in programming a system managed by a processor to handle errors, wherein the article of manufacture comprises program logic to cause the system to perform the steps of:
   processing an error in the system managed;
   generating an interrupt to the processor indicating that an error occurred; and
   executing an error mode before the processor interprets the interrupt by preventing data from transferring between the system and the processor and by processing a read request from the processor by returning data to the processor unrelated to the requested data, wherein the processor interprets the interrupt indicating the error and in response, executes a diagnostic mode to diagnose the error in the system.

30. The article of manufacture of claim 29, further comprising the steps of:
   receiving a signal from the processor, wherein the processor generates the signal after processing the interrupt; and
   ceasing operations of preventing data from transferring between the system and the processor and returning unrelated data in response to read requests from the processor.

31. The article of manufacture of claim 29, wherein the step of preventing the transfer of data between the system and processor comprises the system discarding data transmitted therebetween.

* * * * *